(12) United States Patent
Awaya et al.

(10) Patent No.: US 6,258,458 B1
(45) Date of Patent: Jul. 10, 2001

(54) MAGNETIC DISK SUBSTRATE

(75) Inventors: Kurata Awaya; Kazuyoshi Nishizawa; Kiyoshi Tada, all of Tochigi (JP)

(73) Assignee: Showa Aluminum Corporation, Tokyo (JP)

( * ) Notice: Subject to any disclaimer, the term of this patent is extended or adjusted under 35 U.S.C. 154(b) by 0 days.

(21) Appl. No.: 09/362,973

(22) Filed: Jul. 29, 1999

(30) Foreign Application Priority Data

Jul. 30, 1998 (JP) .................................................. 10-229276

(51) Int. Cl.$^7$ ...................................................... B32B 17/06
(52) U.S. Cl. .............................................................. 428/433
(58) Field of Search ..................................... 428/432, 433

(56) References Cited

U.S. PATENT DOCUMENTS 3,973,072 * 8/1976 Anderson et al. ................... 428/336
3,976,920 * 8/1976 Tadokoro et al. ..................... 29/194

* cited by examiner

Primary Examiner—Francis J. Lorin

(57) ABSTRACT

A provision of a magnetic disk substrate using, as a plated substrate, glass with high hardness in place of aluminum. The magnetic disk substrate is small-sized, can stand against an impact when it is carried, and avoids leaving struck damages (head snap) even if it is used for recent note- or mobile-type computers having a head which is located as closely as possible to the substrate. The magnetic disk substrate comprises forming a nickel/phosphorus coating with a film thickness of 8 $\mu$m–20 $\mu$m or less on crystallized glass with a roughness Ra of 0.05 to 0.5 $\mu$m, the roughness being measured by a tracer and contact type roughness meter after the glass is ground (lapped) and polishing the nickel/phosphorus coating to a depth of 3 $\mu$m or more in a polishing process with the thickness of the plating film left unremoved being 5 $\mu$m or more.

6 Claims, No Drawings

MAGNETIC DISK SUBSTRATE

BACKGROUND OF THE INVENTION a) Field of the Invention

This invention relates to a method for the production of a magnetic disk substrate which is such a high-capacity type as to use an MR head, comprises glass of high quality.

b) Description of the Related Art

Many magnetic disk substrates produced by performing bed nickel/phosphorus plating on the surface of an aluminum alloy blank have been used for the magnetic recording media of computers. Glass substrates have come to be used for small-sized note-type or mobile-type personal computers. Unlike in the case of an aluminum substrate, a magnetic film can be directly applied to the glass substrate without performing bed plating. However, studies have been made on a method in which like in the case of an aluminum substrate, nickel/phosphorus plating is performed on the glass substrate and then a magnetic film is formed on the plated glass substrate to highly densify the memory capacity. In this case, the use of the glass substrate in place of the aluminum substrate reduces the production of a head snap, that is caving in the substrate, caused by the impact of the head as contrasted with the case of using the aluminum substrate.

Generally, when non-electrolyte plating is performed on a non-metal, oxide or plastic, the following method is adopted as shown in, for instance, Japanese Patent Application Laid-Open (JP-A) Nos. S53-19932 and S48-85614. Specifically, the surface of the above material is subjected to pretreatment for plating in which, for example, Sn is absorbed to the surface and a film of a metal (e.g., Pd, Pt or Au) which is reduced in hydrogen overvoltage and is catalytically active is formed on the Sn. More specifically, pretreatment for plating including degreasing, etching, sensitizing, activating and sensitively intensifying steps is carried out and the pretreated surface is then plated using nickel/phosphorus. The plated substrate is polished using well-known polishing particles, e.g., alumina, to obtain a magnetic disk substrate. The mirror-finished surface of the substrate is coated with a magnetic film by sputtering and the resulting substrate is used as a magnetic recording medium. However, when non-electrolyte nickel/phosphorus plating is performed on the surface of glass, the adhesion of the plating is inferior to the case of plating on an aluminum substrate. Hence there is the case where the method is adopted in which the surface roughness Ra of the glass substrate is designed to be in a range between 0.05 and 0.5 $\mu$m to thereby increase the adhesive strength. However, after nickel/phosphorus plating is performed on the substrate having such a surface roughness, only usual polishing to a depth of 1 to 3 $\mu$m cannot get rid of the roughness of the surface. The roughness left unremoved causes the generation of pits. Also, if the thickness of the left film becomes 5 $\mu$m or less by polishing, the polished depth reaches a hollow portion in a plating film which portion is formed at an inferior plating point on the surface of the glass thereby causing polished pits with the result that the glass substrate cannot be used as a substrate for a magnetic recording medium like the above.

In view of this situation, it is an object of the present invention to provide a magnetic disk substrate using, as a plated substrate, glass with high hardness in place of aluminum. The magnetic disk substrate is small-sized, can stand against an impact when it is carried, and avoids leaving struck damages (head snap) even if it is used for recent note- or mobile-type computers having a head which is located as closely as possible to the substrate.

SUMMARY OF THE INVENTION

The present invention provides a magnetic disk substrate in which a nickel/phosphorus coating with a film thickness of 8 to 20 $\mu$m or less is formed on crystallized glass with a roughness Ra of 0.05 to 0.5 $\mu$m, the roughness being measured by a tracer and contact type roughness meter after the glass is ground (lapped) and the nickel/phosphorus coating is polished to a depth of 3 $\mu$m or more in a polishing process with the thickness of the plating film left unremoved being 5 $\mu$m or more.

The glass used in the present invention has a roughness Ra of 0.05 to 0.5 $\mu$m, the roughness being measured by a tracer and contact type roughness meter after the glass is ground (lapped). In the present invention, also, the film thickness of the nickel/phosphorus coating is determined to be 8 to 20 $\mu$m or less and the polished depth in a process for polishing the nickel/phosphorus coating and the thickness of the plating film left unpolished are also determined to be 3 $\mu$m or more and 5 $\mu$m or more respectively. When the thickness of the nickel/phosphorus coating is less than 8 $\mu$m, if the polished depth is larger than 3 $\mu$m, the thickness of the plating film is thin which causes the generation of pits. To state in another way, when the thickness of the film left unpolished is 5 $\mu$m or less, pits generated by polishing tend to occur whereas when the film thickness of the nickel/phosphorus coating exceeds 20 $\mu$m, no additional effect can be obtained leading to the cost-up.

DESCRIPTION OF THE PREFERRED EMBODIMENTS

The present invention will now be explained in detail. To show an instance of a method for forming a nickel/phosphorus plating film on the surface of the crystallized glass with a hollow disk form, a pretreatment comprising the following steps, nickel/phosphorus plating and a polishing process are performed.

1) First, the glass disk is subjected to a degreasing step for five minutes or more. In the degreasing step, it is preferable that the disk be treated by, for instance, ultrasonic degreasing in an organic solvent (ethanol, methanol or isopropyl alcohol).

2) The resulting disk is etched for 1 to 10 minutes and preferably 3 to 5 minutes by using a mixture solution of an aqueous solution (bath temperature: room temperature to 80° C., and preferably room temperature to 40° C., concentration: 40 ml/l to 200 ml/l) of boron hydrofluoric acid (bath temperature: room temperature to 60° C., and preferably room temperature to 40° C., concentration: 30 ml/l to 500 ml/l) or hydrofluoric acid (bath temperature: room temperature to 60° C., concentration: 30 ml/l to 500 ml/l and preferably 30 ml/l to 100 ml/l) and a fluoride compound such as ammonium fluoride and nitric acid (bath temperature: room temperature to 60° C., and preferably room temperature to 40° C., concentration: 30 ml/l to 500 ml/l).

3) The resulting disk is dipped for 20 to 100 seconds in a bath kept at 20° C. to 40° C. and containing a mixture solution of 50–150 g/l and preferably 80–120 g/l of stannous chloride and 30–120 ml/l and preferably 30–80 ml/l of 38% hydrochloric acid to carry out sensitizing treatment.

4) Excess tin is washed away while the resulting disk is moved in hot pure water at 50° C. or more. The washing time is 20 to 90 seconds and preferably 20 to 40 seconds. Tin eluted from the disk is isolated as tin hydroxide in the solution after the washing step and will re-adhere to the disk thereby causing pits to generate. It is therefore desirable that, as to the hot pure water, a new liquid can be made up and the waste water can be drained.

5) The resulting disk is activated for 2 to 10 minutes in a treating solution (bath temperature: room temperature to 50° C.) for activation which contains 0.1% of palladium chloride and 10–50 ml/l of 35% hydrochloric acid.

6) The resulting disk is dipped in boron hydrofluoric acid (bath temperature: room temperature to 80° C. and preferably room temperature to 40° C., concentration: 30 ml/l to 500 ml/l) for 20 to 80 seconds to perform sensitively intensifying treatment.

7) After the resulting disk is washed in ethanol, it is treated under heat at 70° C. or more for 5 to 100 minutes.

8) The resulting disk is plated for 50 to 200 minutes in a non-electrolyte nickel/phosphorus plating bath containing 20–50 g/l of nickel sulfate hexahydrate, 20–100 g/l of sodium hypophosphite monohydrate and 2–30 g/l of ammonium sulfate as a complexing agent and adjusted to a pH of 4.0 to 5.2 to form a nickel/phosphorus film with a thickness of 8 to 20 $\mu$m.

9) The resulting disk after the plating is finished is not different from lapped products in roughness (Ra=0.1–0.5 $\mu$m) on account of pits and nodules. In order to smooth the resulting disk to a level of roughness allowable to secondary polishing for a magnetic disk, the disk is processed using a slurry containing alumina, titania, silica and 5–30% of abrasive grains with a particle size of 0.5 to 2.0 $\mu$m at a processing pressure of 30 to 80 g/cm$^2$ for 4 to 50 minutes in a rotary-type duplex polishing machine to which a non-woven polishing fabric is applied to polish to a depth of 3 $\mu$m or more, or more preferably 5 $\mu$m or more, so that the film with a thickness of 5 $\mu$m or more, or more preferably 8 $\mu$m or more, remains unpolished, resulting in the production of a magnetic disk substrate formed with a nickel/phosphorus film on the crystallized glass, the disk substrate having no pit and being superior in the adhesion and resistance to an impact of head snap.

EXAMPLES

Secondarily lapped substrates (Ra=0.2 $\mu$m) of donut-like crystallized glass with an outside diameter of 3.5 inches and a thickness of about 20 $\mu$m were treated in the steps of 1) ultrasonically degreasing in ethanol for 10 minutes, 2) etching in boron hydrofluoric acid at 25° C. for 5 minutes, 3) sensitizing in stannous chloride at 25° C. for 30 seconds, 4) activating in palladium chloride at 25° C. for 30 seconds and 5) controlling in a boron hydrofluoric acid. The resulting substrate was subjected to non-electrolyte plating with a thickness of 12 $\mu$m and polished using well-known alumina particles with a grain size of 1 to 5 $\mu$m. These test samples are shown in Table 1. Each of these test samples were examined whether or not the pits were generated in different conditions with respect to the thickness of the plating formed, polished depth and the thickness of the film left unpolished. In Table 1, the test examples 1 to 5 show examples according to the present invention and the test examples 6–11 show comparative examples. In Table 1, the symbol "⊚" shows that no pit was observed, "◯" shows that one or two pits were observed and the symbol "X" shows that three or more pits were observed.

TABLE 1

| Number of test examples | Thickness of plating formed ($\mu$m) | Polished depth ($\mu$m) | Thickness of film left unpolished ($\mu$m) | Generation of pits |
|---|---|---|---|---|
| Test example 1 | 8 | 3 | 5 | ◯ |
| Test example 2 | 12 | 5 | 7 | ◯ |
| Test example 3 | 12 | 7 | 5 | ◯ |
| Test example 4 | 18 | 5 | 13 | ⊚ |
| Test example 5 | 18 | 8 | 10 | ⊚ |
| Test example 6 | 5 | 3 | 2 | X |
| Test example 7 | 8 | 5 | 3 | X |
| Test example 8 | 12 | 2 | 10 | X |
| Test example 9 | 12 | 9 | 3 | X |
| Test example 10 | 18 | 2 | 16 | X |
| Test example 11 | 18 | 16 | 2 | X |

⊚: No pit was observed,
◯: One or two pits were observed,
X: Three or more pits were observed.

As is understood from Table 1, the generation of three or more pits was observed in Test example 6 in which the thickness of the nickel/phosphorus plating formed was 5 $\mu$m, in Test examples 8 and 10 in which the polished depth is as small as 2 $\mu$m and in Test examples 6, 7, 9 and 11 in which the thickness of the film left unpolished is small. On the contrary, the generation of pits was not observed or only one or two pits were observed in the Test examples according to the present invention.

As stated above, the present invention comprises using a glass substrate (which may be either a crystallized glass substrate or a plate glass substrate) with high hardness and forming a specific nickel/phosphorus coating on the glass substrate and is very suitable as a recent magnetic disk substrate in which a head is disposed close to a magnetic disk substrate and which is more increased in its demand with the spread of note- or mobile-type computers.

Though preferred embodiments according to the present invention are described, it should be recognized that various modifications are possible within the scope of the present invention.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A magnetic hard disk substrate comprising a nickel/phosphorus coating with a film thickness of 8 to 20 $\mu$m or less being formed on glass, wherein the nickel/phosphorus coating is polished to a depth of 3 $\mu$m or more in a polishing process with the thickness of a plating film left unremoved being 5 $\mu$m or more.

2. A magnetic hard disk substrate according to claim 1, wherein the glass substrate comprises crystallized glass.

3. A magnetic hard disk substrate according to claim 1, wherein a roughness Ra of the glass Is 0.05 to 0.5 $\mu$m, the roughness being measured by a tracer and contact type roughness meter after the glass is ground.

4. A magnetic hard disk substrate according to claim 1, wherein the nickel/phosphorus coating is polished to a depth of 5 $\mu$m or more.

5. A magnetic hard disk substrate according to claim 1, wherein the plating film left unremoved Is 8 $\mu$m or more.

6. A magnetic hard disk substrate according to claim 1, wherein the nickel/phosphorus coating is polished to a depth of 5 $\mu$m or more and the plating film left unremoved is 8 $\mu$m or more.

* * * * *